United States Patent [19]

Ando et al.

[11] Patent Number: 4,517,113

[45] Date of Patent: May 14, 1985

[54] PROCESS FOR REMOVAL OF UNREACTED OIL FROM SURFACTANT SLURRY

[75] Inventors: Hideo Ando, Katsushika; Kentaro Kiyama, Chofu; Kyozo Kitano, Narashino, all of Japan

[73] Assignee: Lion Corporation, Tokyo, Japan

[21] Appl. No.: 556,224

[22] Filed: Nov. 29, 1983

[30] Foreign Application Priority Data

Sep. 12, 1982 [JP] Japan ............................... 57-214618

[51] Int. Cl.³ ..................... B01D 3/10; B01F 17/02; C07C 143/02
[52] U.S. Cl. ................................. 252/353; 252/555; 252/533; 252/552; 260/513 R; 203/92
[58] Field of Search ............... 252/353, 533, 552, 555; 203/92; 260/513 R

[56] References Cited

U.S. PATENT DOCUMENTS

| | | | |
|---|---|---|---|
| 2,945,818 | 7/1960 | Costine et al. | 252/353 |
| 3,660,471 | 5/1972 | Sawano et al. | 260/513 R |
| 3,893,940 | 7/1975 | Ohogoshi et al. | 252/353 |
| 4,035,242 | 7/1977 | Brandt | 260/513 R X |
| 4,108,193 | 8/1978 | Flournoy et al. | 252/353 X |
| 4,147,638 | 4/1979 | Plummer | 252/353 X |

*Primary Examiner*—Christine M. Nucker
*Assistant Examiner*—Catherine S. Kilby
*Attorney, Agent, or Firm*—Armstrong, Nikaido, Marmelstein & Kubovcik

[57] ABSTRACT

A process for effectively removing unreacted oil from a surfactant slurry containing the same comprising:

continuously feeding steam from one side of a pressure vessel into an anionic surfactant slurry containing unreacted oil in the pressure vessel while maintaining a pressure in the system of at least 5 kg/cm²; and simultaneously discharging the anionic surfactant slurry from the other side of the pressure vessel into a low pressure region to effect vaporization of the unreacted oil from the anionic surfactant slurry.

4 Claims, 1 Drawing Figure

PROCESS FOR REMOVAL OF UNREACTED OIL FROM SURFACTANT SLURRY

BACKGROUND OF THE INVENTION

1. Field of the Invention

The present invention relates to a process for effectively removing unreacted oil from an anionic surfactant slurry containing the same.

2. Description of the Prior Art

Various methods for removing unreacted components from anionic surfactant slurries are known in the art. Known methods are, for example, those in which unreacted oil is extracted with an organic solvent (i.e., an extraction method), an anionic surfactant slurry is steam distilled under normal pressures (i.e., a steam distillation method), an anionic surfactant slurry is stripped after adding a polyol or polyoxyalkylene alkyl ether as disclosed in U.S. Pat. No. 3,893,940 (i.e., a stripping method), and unreacted oil is adsorbed by adding activated carbon to an anionic surfactant slurry as disclosed in Japanese Examined Patent Publication (Kokoku) No. 56-8026 (i.e., an adsorption method). However, the extraction and stripping methods involve a problem in that complete removal of the organic solvent used is difficult so that a solvent odor is remained in the product. The adsorption method requires the separation and removal of the activated carbon used, which operation is troublesome. On the other hand, although the steam distillation method does not involve the above-mentioned problems, this method is not economical since a large amount of steam is consumed and is not effective since foaming or a similar phenomenon occurs due to the presence of a surfactant during the operation.

SUMMARY OF THE INVENTION

Accordingly, the objects of the present invention are to eliminate the above-mentioned problems in the prior art and to provide a process for effectively removing unreacted oil from an anionic surfactant slurry containing the same in a simple operation.

Other objects and advantages of the present invention will be apparent from the following description.

In accordance with the present invention, there is provided a process for removing unreacted oil from a surfactant slurry containing the same comprising: continuously feeding steam from one side of a pressure vessel into an anionic surfactant slurry containing unreacted oil in the pressure vessel while maintaining a pressure in the system to at least 5 kg/cm$^2$; and simultaneously discharging the anionic surfactant slurry from the other side of the pressure vessel into a low pressure region to effect vaporization of the unreacted oil from the anionic surfactant slurry.

BRIEF DESCRIPTION OF THE DRAWING

The present invention will be better understood from the description set forth below with reference to the accompanying drawing of FIG. 1 which schematically illustrates an embodiment of an apparatus used in the practice of the present process.

DESCRIPTION OF THE PREFERRED EMBODIMENT

Figure 1:
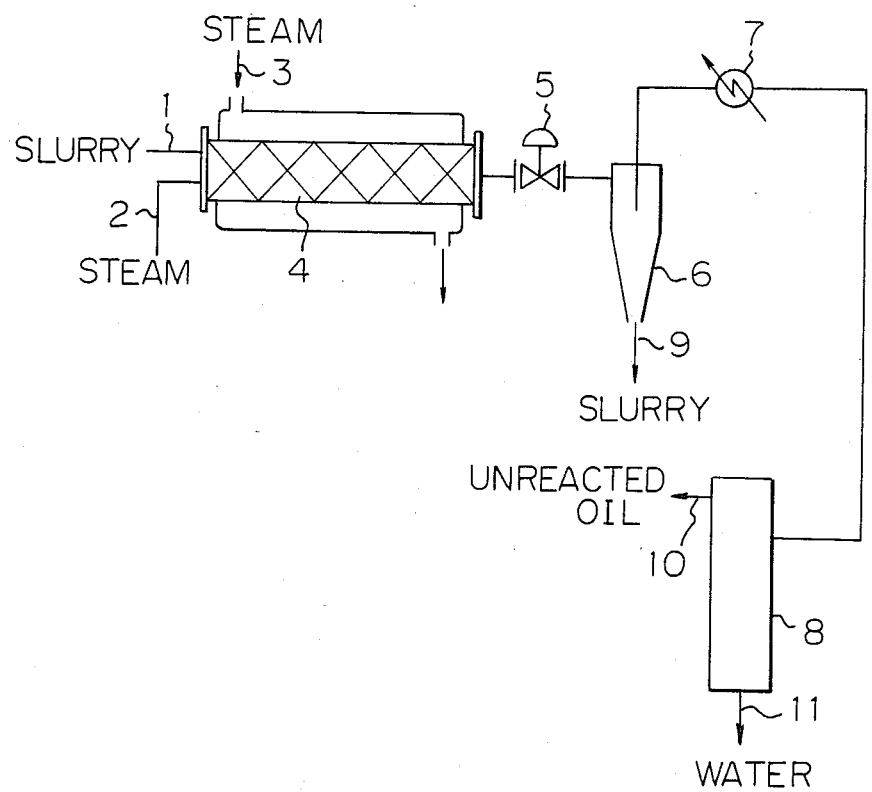

The anionic surfactant slurries to be treated according to the present invention are those obtained from sulfonation or sulfation of organic starting materials such as olefins having 10 to 22 carbon atoms, paraffins having 10 to 22 carbon atoms, long chain aliphatic alcohols having 8 to 22 carbon atoms, and alkylbenzenes having an alkyl group with 8 to 16 carbon atoms, followed by neutralization. Typical examples of the anionic surfactants are alkali metal salts, alkaline earth metal salts, ammonium salts, and alkanol amine salts of internal olefin sulfonic acids, alpha-olefin sulfonic acids, paraffin sulfonic acids, and alkylbenzene sulfonic acids. These sulfonates may be contained, alone or in any mixture thereof, in the anionic surfactant slurries.

The anionic surfactant slurries used in the present invention generally contain 10% to 50% by weight of the above-mentioned anionic surfactants and 5 parts to 50 parts by weight of the unreacted oil based on 100 parts by weight of the surfactants. Furthermore, the anionic surfactants may optionally contain inorganic salts (i.e., by-products), chelating agents such as ethylenediaminetetraacetic acid (i.e., EDTA), citric acid, and the salts thereof, pH buffers such as benzoic acid, antibacterial agents, and other conventional ingredients. It should be noted that, of these anionic surfactant slurries, the present invention can be especially effective when applied to anionic surfactant slurries of internal olefin sulfonates and paraffin sulfonates, which are less reactive during sulfonation and which contain unreacted oil in a large amount, e.g., 5% to 30% by weight based on the surfactant.

The internal olefin sulfonates are those obtained from conventional sulfonation of $C_{10}$ to $C_{22}$ olefins having a double bond in a non-terminal portion of the carbon chain thereof, followed by neutralization and hydrolysis. The internal olefin sulfonates generally contain 10% to 50% by weight of alkene sulfonates, 90% to 50% by weight of hydroxyalkane sulfonates, and 0% to 25% by weight of disulfonates.

According to the present invention, the anionic surfactant slurries should be contained in a pressure-resistant vessel or container and should be maintained under a pressure of 5 kg/cm$^2$ or more. In order to create a high pressure in the vessel, it is desirable to heat and/or to introduce steam into the vessel. Accordingly, the use of pressure-resistant vessels capable of being outwardly heated by, for example, electric heating or steam heating is desirable. In the practice of the present invention, the anionic surfactant slurries are desirably preheated near to an operation temperature before feeding the slurries into the pressure vessel, from the viewpoints of steam consumption and vessel volume. Furthermore, the anionic surfactant slurries may be allowed to stand, after preheating, to separate the slurries into an upper layer (i.e., unreacted oil) and a lower layer (i.e., a mixture of unreacted oil and the surfactant) and, then, the resultant lower layer may be subjected to the present process after removing the upper layer therefrom.

The steam fed into the anionic surfactant slurries is, for example, saturated steam having a temperature of 130° C. to 250° C. Although the amount of steam fed into the anionic surfactant slurries can be appropriately determined depending upon the pressure, the steam is desirably used in an amount of 5 to 80 times by weight, especially 15 to 60 times by weight, of the unreacted oil in view of the treatment efficiency. If the amount of the steam is less than 5 times by weight of the unreacted oil, a sufficient removal efficiency of the unreacted oil cannot be obtained. Contrary to this, if the amount of the steam is more than 80 times by weight of the unreacted oil, the removal efficiency is not increased with the increase in the amount of steam so that it is not desirable from the economical point of view. In order to increase a gas-liquid contact efficiency of the steam and the slurry, Raschig rings, stationary type mixing devices, or other similar mixing means can be desirably placed or equipped in the gas-liquid region to economically decrease the feed amount of the steam.

The steam is continuously introduced into the anionic surfactant slurry under a high pressure of 5 kg/cm$^2$ or more, preferably 7 to 50 kg/cm$^2$. The desirable gas-liquid contact time of the steam and the slurry under the high pressure is about 5 minutes or more. The removal efficiency of the unreacted oil increases as the contact time becomes long. However, since too long a gas-liquid contact time tends to result in deterioration of the recovered unreacted oil and the surfactant slurries, the gas-liquid contact time is preferably about 30 minutes or less.

Although the pressure in the discharge zone is sufficient if less than the above-mentioned high pressure, the surfactant slurry is flashed off under an atmospheric pressure. The flashed gas is recovered as a condensate in a heat exchanger and the unreacted oil and water are readily separated by a settling separation. The recovered unreacted oil can be recycled to a sulfonation or sulfation step directly or after being purified by a dewatering treatment or an activated clay treatment.

The removal of unreacted oil from a surfactant slurry according to the present invention can be carried out in, for example, an apparatus as shown in FIG. 1.

An anionic surfactant slurry containing unreacted oil is quantitatively fed via a line 1 by means of a feed pump (not shown) into a pressure resistant vessel (resistant up to 100 kg/cm$^2$G) 4 provided with a jacket and packed with Raschig rings. On the other hand, saturated steam having a temperature of about 130° C. to about 250° C. is continuously fed via a line 2 into the vessel 4, while maintaining the pressure within the vessel 4 to 5 kg/cm$^2$ or more by a pressure control valve 5 provided at the outside of the vessel 4. Thus, the gas-liquid contact is thoroughly effected in the vessel 4. Then, the gas-liquid mixture is flashed, under an atmospheric pressure, in a cyclone type gas-liquid separator 6. The pressure vessel 4 is desirably kept warm or heated by passing steam from a portion 3 through the jacket.

The flashed unreacted oil and steam are condensed in a condenser 7 and the condensate is separated in a settling separator 8. The separated unreacted oil is recovered from a line 10 and the separated water is recovered from a line 11. The anionic surfactant slurry is obtained as an aqueous slurry from a bottom 9 of the gas-liquid separator 6, without evaporating upon flashing.

According to the present invention, unreacted oil is effectively recovered from an anionic surfactant slurry as mentioned above. Especially, according to the present invention, the following advantages can be obtained:

(1) Since the removal of the unreacted oil is effected under a high pressure of 5 kg/cm$^2$ or more, undesirable foaming due to the presence of the surfactant can be readily prevented and, therefore the removal efficiency of the unreacted oil is remarkably increased; and (2) Since saturated steam having a high temperature of 130° C. to 250° C. is used, a molar fraction of an oil component in the distilled or flashed vapor becomes large and the steam consumption required for the recovery of the unreacted oil becomes very small.

EXAMPLE

The present invention now will be further illustrated by, but is by no means limited to, the following examples, in which all percentages are expressed on a weight basis unless otherwise specified.

EXAMPLE 1

Olefins having an internal double bond and having 13 and 14 carbon atoms ($C_{13}$: 55%, $C_{14}$: 45%; positions of double bonds 1-position 0%, 2-position 27%, 3-position 21%, 4-position 20%, and 5 to 7 positions 32%) were sulfonated by using a continuous thin-film type sulfonator and, then, the sulfonated product was neutralized and hydrolyzed in a conventional manner. Thus, an aqueous slurry of sodium internal olefin sulfonates having a surfactant content (i.e., "AI") of 30% and a unreacted oil content of 25% based on AI was obtained.

The aqueous anionic surfactant slurry thus obtained was treated by using an apparatus shown in FIG. 1. The anionic surfactant slurry was quantitatively fed via a line 1 into a pressure vessel 4 at a rate of 10 kg/hr, while saturated steam having a pressure of 13 kg/cm$^2$G (gauge) was introduced, via a line 2, into the pressure vessel 4. The pressure vessel 4 having a capacity of 10 liters was packed with Raschig rings and was kept warm or heated by passing steam having a pressure of 13 kg/cm$^2$G through a jacket of the vessel 4.

The gas-liquid contact was effected in the vessel 4 by changing the feed amounts of the steam and by controlling the system pressures by means of a pressure control valve 5. Thus, the mixture of the aqueous surfactant slurry and the steam was flashed off under an atmospheric pressure to recover a surfactant slurry from the bottom 9 of a separator 6 and unreacted oil from a line 10.

The results thus obtained and the operation conditions are shown in Table 1.

TABLE 1

| Run Nos. | 1*3 | 2*3 | 3 | 4 | 5 | 6 |
|---|---|---|---|---|---|---|
| Conditions | | | | | | |
| Steam feed amount*1 | 0 | 40 | 60 | 40 | 30 | 15 |
| System pressure (kg/cm$^2$G) | 10 | 2 | 7 | 7 | 10 | 10 |
| Result | | | | | | |
| Surfactant slurry AI (%) | 33 | 25 | 26 | 26 | 28 | 29 |
| Surfactant unreacted oil (%)*2 | 22.7 | 11.3 | 1.6 | 2.1 | 2.6 | 3.0 |
| Removal efficiency of unreacted oil (%) | 92 | 55 | 94 | 92 | 90 | 88 |

*1Times by weight based on unreacted oil
*2Based on AI
*3Comparative examples

EXAMPLE 2

Unreacted oil was removed from various aqueous surfactant slurries listed in Table 2 in the same manner as in Example 1 except that 5 kg/hr of slurry was fed and saturated steam having a pressure of 45 kg/cm$^2$G was used as the steam fed into the slurry and as the jacket steam.

The results are shown in Table 3.

TABLE 2

| Kind of surfactant | AI (%) | Unreacted oil (%)*1 | Carbon distribution |
|---|---|---|---|
| Sodium internal olefin sulfonate (IOS-Na) | 35 | 35 | $C_{14}$: 15%, $C_{16}$: 50%, $C_{18}$: 35% |

TABLE 2-continued

| Kind of surfactant | AI (%) | Unreacted oil (%)*1 | Carbon distribution |
|---|---|---|---|
| Sodium paraffin sulfonate (PS-Na) | 15 | 50 | $C_{13}$ or less: 18%, $C_{14}$: 25%, $C_{15}$: 25%, $C_{16}$: 18%, $C_{17}$ or more: 14% |
| Potassium alkyl sulfate ester (AS-K) | 15 | 7 | $C_{12}$: 21%, $C_{13}$: 29%, $C_{14}$: 33%, $C_{15}$: 17% |
| Sodium alkylbenzene sulfonate (LAS-Na) | 45 | 5 | $C_{10}$: 12%, $C_{11}$: 31%, $C_{12}$: 27%, $C_{13}$: 22%, $C_{14}$: 8% |

*1 Based on AI

TABLE 3

| Kind of surfactant | IOS-Na | PS-Na | AS-K | LAS-Na |
|---|---|---|---|---|
| Condition | | | | |
| Steam feed rate*1 | 80 | 40 | 50 | 40 |
| System pressure (kg/cm²G) | 10 | 30 | 20 | 20 | 40 |
| Result | | | | |
| Surfactant slurry AI (%) | 30 | 31 | 9 | 9 | 40 |
| Surfactant unreacted oil*2 | 2.1 | 2.9 | 6.7 | 0.7 | 0.5 |
| Removal efficiency of unreacted oil (%) | 94 | 92 | 87 | 90 | 90 |

*1Times by weight based on unreacted oil
*2Based on AI

We claim:

1. A process for removing unreacted oil from a surfactant slurry containing the same comprising:
   continuously feeding steam from one side of a pressure vessel into an anionic surfactant slurry containing unreacted oil in the pressure vessel while maintaining a pressure in the system of at least 5 kg/cm²; and
   simultaneously discharging the anionic surfactant slurry from the other side of the pressure vessel into a low pressure region to effect vaporization of the unreacted oil from the anionic surfactant slurry.

2. A process as claimed in claim 1, wherein the feed amount of the steam is 5 to 80 times by weight of the unreacted oil.

3. A process as claimed in claim 1, wherein the anionic surfactant slurry contains 10% to 50% by weight of an anionic surfactant and 5 parts to 50 parts by weight of the unreacted oil based on 100 parts by weight of the anionic surfactant.

4. A process as claimed in claim 1, wherein the anionic surfactant is an internal olefin sulfonate or a paraffin sulfonate.

* * * * *